Figure 1:
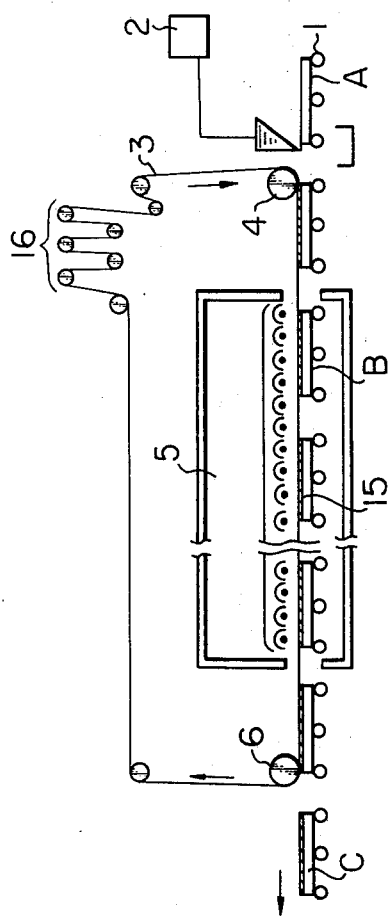

United States Patent [19]

Oshima et al.

[11] 3,968,305

[45] July 6, 1976

[54] MAR-RESISTANT SYNTHETIC RESIN SHAPED ARTICLE

[75] Inventors: Akira Oshima; Keisuke Yoshihara; Mikio Shiki; Tuneo Ikeda, all of Otake, Japan

[73] Assignee: Mitsubishi Rayon Co., Ltd., Tokyo, Japan

[22] Filed: Sept. 18, 1974

[21] Appl. No.: 507,000

Related U.S. Application Data

[63] Continuation-in-part of Ser. No. 212,047, Dec. 27, 1971, abandoned.

[30] Foreign Application Priority Data

Feb. 13, 1974 Japan............................. 49-17364

[52] U.S. Cl................................ 428/334; 427/44; 427/54; 427/164; 428/412; 428/519
[51] Int. Cl.² ........................................ B05D 3/06
[58] Field of Search............ 117/93.31; 204/159.22, 204/159.23; 427/44, 54, 164; 428/412, 519, 334

[56] References Cited
UNITED STATES PATENTS 2,413,973  1/1947  Howk et al. .................... 117/93.31
3,552,986  1/1971  Bassemir et al. ................ 117/93.31
3,594,264  7/1971  Urban ................................ 161/165
3,661,614  5/1972  Bassemir et al. ................ 117/93.31
3,770,490  11/1973  Parker ............................. 117/93.31

Primary Examiner—John H. Newsome
Attorney, Agent, or Firm—Armstrong, Nikaido & Wegner

[57] ABSTRACT

A synthetic resin shaped article having a mar-resistant polymer surface layer integrated with the polymer body is provided. The mar resistant polymer surface layer consisting essentially of, in polymerized form, (a) 20 to 100 wt.% of a compound having a total of at least three acryloxy and/or metharyloxy groups linked with a straight chain aliphatic hydrocarbon residue having not more than 20 carbon atoms (the hydrocarbon residue may contain at least one ether linkage in the main chain) and (b) 0 to 80 wt.% of at least one copolymerizable mono- or diethylenically unsaturated compound.

12 Claims, 4 Drawing Figures

MAR-RESISTANT SYNTHETIC RESIN SHAPED ARTICLE

This application is a continuation-in-part application filed Dec. 27, 1971 now abandoned of Ser. No. 212,047.

The present invention relates to synthetic resin shaped article having improved abrasion resistance particularly scratch resistance.

Thermoplastic synthetic resins such as polymethyl methacrylate, a methyl methacrylate copolymer, polystyrene, polycarbonate and the like are in general useful for shaped articles, which are transparent and of attractive appearance, such as so-called "plastic lenses" used for sunglasses, wristwatches, cameras, welder's helmets and gas masks; and protector plates used for radio dials and various gauges and meters; mirrors; and car window glasses. Such shaped articles are liable to be scratched or become abraded during processing, transportation and use thereof. Scratches and abrasions are usually fatal to such shaped articles from a commercial point of view.

Many proposals have been heretofore put forth in order to impart an abrasion resistance to thermoplastic synthetic resin shaped articles. Most of the proposals involve the formation of a protective surface layer composed of a crosslinked polymer on the shaped articles. Such a crosslinked polymer is produced from, for example, allyl methacrylate as disclosed in U.S. Pat. No. 2,479,935, diethylene glycol dimethacrylate as disclosed in U.S. Pat. No. 2,997,745, diethylene glycol bisallylcarbonate as disclosed in U.S. Pat. No 3,465,076, or tetraethylene glycol dimethacrylate as disclosed in U.S. Pat. No. 3,518,341.

These protective surface layers improve mar resistance of the base resin articles, as determined by the Falling Carborundum Testing Procedure in accordance with ASTM D-673-33, to some extent but never to any outstanding degree. Cast articles having such a protective surface layer become scratched when subjected to a severe abrasion test. For example, a methyl methacrylate resin article having a protective surface layer of poly-(diethylene glycol bisallylcarbonate) or polydimethacrylate such as poly-tetraethylene glycol dimethacrylate, as described in U.S. Pat. Nos. 3,465,076 and 3,518,341 respectively, receives few or no scratches when subjected to the abrasion test, hereinafter set forth, wherein the specimen is rubbed with a steel wool pad of a 25 mm diameter at a load of approximately 100 g, but becomes scratched to considerable degree when subjected to the abrasion test at a load of approximately 1000 g or more, although the extent of scratches is far lesser than that of a methyl methacrylate resin article having no protective film surface layer, which become easily scratched at a pressure of 10 g.

It has now been found that a synthetic resin shaped article having a synthetic resin protective surface layer is obtained by forming the protective surface layer from a composition comprising a compound having a total of at least three acryloxy ($CH_2 = CH.CO.O-$) and/or methacryloxy ($CH_2 = C(CH_3).CO.O-$) groups in the molecule, said acryloxy or methacryloxy groups being linked with a straight chain aliphatic hydrocarbon residue having not more than 20 carbon atoms (the straight chain aliphatic hydrocarbon residue may contain one or more ether linkages in the main chain) or a mixture thereof.

A photopolymerizable composition, comprising (i) an ester of an ethylenically unsaturated acid and pentaerythritol, dipentaerythritol or polypentaerythritol and (ii) a halogenated hydrocarbon photoinitiator, has been proposed as a vehicle for inks and coatings which are to be subsequently printed, as described in U.S. Pat. No. 3,551,311. However, the polymer layer formed from this composition are soft due to the plasticizing effect of the halogenated dydrocarbon photoinitiator used, and do not provide a protective layer of abrasion resistance.

It is an object of the present invention to provide a synthetic resin shaped article having a polymer surface layer of improved mar resistance, integrated with the polymer body.

Another object of the present invention is to provide synthetic resin shaped articles which are transparent and of attractive appearance as well as of improved mar resistance, such as so-called "plastic lenses" used for, for example, sunglasses, wristwatches, cameras, welder's helmets, telescopes and microscopes; protector plates for radio dials and other various gauges and meters; mirrors; phonograph covers; and car window glasses.

In accordance with the present invention, there is provided a synthetic resin shaped article having a mar resistant polymer surface layer integrated with the polymer body, said polymer surface layer comprising, in polymerized form, (a) 20 to 100% by weight of a compound having a total of at least three acryloxy ($CH_2 = CH.CO.O-$) and/or methacryloxy ($CH_2 = C(CH_3).CO.O-$) groups in the molecule, said acryloxy and methacryloxy groups being linked with a straight chain aliphatic hydrocarbon residue having not more than 20 carbon atoms or a straight chain aliphatic hydrocarbon residue having at least one ether linkage in the main chain and having not more than 20 carbon atoms and (b) 0 to 80% by weight of at least one copolymerizable monoethylenically or diethylenically unsaturated compound.

The shaped article of the invention having such a polymer surface layer is characterized as possessing a mar resistance improved to an extent such that no appreciable scratches are produced when a pad of a 25 mm diameter composed of No. 000 steal wool (having a thickness of 0.014 mm) is rotated 100 revolutions at a rate of 40 r.p.m. while being pressed against the shaped article at a load of 1,000 g, and in most cases even while the pad is pressed thereagainst at a load of 3,000 g.

The shaped article of the invention is produced by a process which comprises the steps of:

a. spreading onto all or part of the inner surface of a mold member a polymerizable material selected from i. a compound having a total of at least three acryloxy and/or methacryloxy groups in the molecule, said acryloxy or methacryloxy groups being linked with an aliphatic hydrocarbon residue having not more than 20 carbon atoms, ii. a monomer mixture comprising at least 20% by weight of said compound and at most 80% by weight of at least one other copolymerizable monomer and iii. a partially polymerized product of said compound or said monomer mixture, b. polymerizing the polymerizable material to an extent such that the polymerized material is not swollen with or dissolved in a monomer to be formed into the polymer body, thereby forming an abrasion-resistant polymer layer on the inner surface of the mold member, and c. charging a mixture of the monomer for the polymer body and a polymerization initiator into the mold and then, polymerizing the monomer.

Alternatively, the shaped article of the invention is produced by a process which comprises the steps of:

a'. spreading a polymerizable material, defined in the step (a) of the preceding process, directly onto all or part of the surface of a synthetic resin shaped article and then, b'. polymerizing the polymerizable material.

A polymer prepared from the polymerizable material used as a protective surface layer-forming material in the present invention is too brittle to be made in alone into a shaped article. But, in the case where a synthetic resin having a moderate impact resistance is combined as a base material with the protective surface layer-forming material, the two resins result, conjointly with each other, in a shaped article of high practical value.

In accordance with the most preferred embodiment of the process for producing the shaped article of the present invention, firstly, the surface layer forming polymerizable material is spread on the inner surface of a mold member together with a proper amount of a polymerization initiator. To the spread material, a solid film having little or no affinity for the material is made to adhere closely in such a manner that no air bubble is left therebetween. Then, the monomer is polymerized to an extent such that the polymerized material is not swollen with or dissolved in a monomeric material to be formed into the polymer body. After peeling off the covered film from the polymerized material, the mold members are assembled into a mold. The mold is then filled with a mixture comprising a monomeric material to be formed into the polymer body and a polymerization initiator and closed, and then heated to perform the polymerization. After the completion of the polymerization, the mold members are removed from the cast article.

Compounds having a total of at least three acryloxy and/or methacryloxy groups in the molecule, said acryloxy or methacryloxy groups being linked with a straight chain aliphatic hydrocarbon residue having not more than 20 carbon atoms, which are used as a surface layer-forming material of the present invention, are preferably prepared from polyhydric alcohol having at least three hydroxyl groups or its derivative and acrylic or methacrylic acid or its chloride or ester. Polyhydric alcohol residue, i.e. the residue joined to the acryloxy group and/or the methacryloxy group is an aliphatic hydrocarbon or its derivatives. The residue may be a straight chain aliphatic hydrocarbon having at least one ether linkage in the main chain. Most preferable compounds used as a surface layer-forming material are those which have three or four acryloxy groups in the molecule, the respective groups are linked with a straight chain aliphatic hydrocarbon having at most 20 carbon atoms, particularly at most 10 carbon atoms.

When a residue linking the respective acryloxy or methacryloxy groups is either a cyclic hydrocarbon or a hydrocarbon having at least one linkage selected from amide, urethane and ester, it is difficult to complete the polymerization thereof within a resonable period of time and the resulting shaped article is poor in mar resistance as well as weather and water resistances. When the residue is a straight chain aliphatic hydrocarbon having 20 or more carbon atoms, the polymerizable material is in general too viscous and it is difficult to obtain a protective surface layer of uniform thickness.

The compound having a total of at least three acryloxy and/or methacryloxy groups should be used in amount of at least 20% by weight, preferably at least 40% by weight, based on the total weight of this compound and the copolymerizable mono- or diethylenically unsaturated compound.

Preferable polyhydric alcohols used in the preparation of the surface layer-forming material include, for example, trimethylolethane, trimethylolpropane, 1,2,6-hexanetriol, glycerol, diglycerol, pentaerythritol, dipentaerythritol and the like. Particularly, acrylate compounds obtained from these polyhydric alcohols and acrylic acid result in a polymer exhibiting excellent abrasion resistance and superior weather resistance.

Methacrylate compounds obtained from the above polyhydric alcohols and methacrylic acid are inferior to the acrylate compounds in that the rate of polymerization and the finally obtainable conversion are low and the resulting polymer is somewhat brittle, although methacrylate compounds are superior to other polymerizable unsaturated compounds. Therefore, for optimum results, the methacrylate compounds are used together with the acrylate compounds in amounts such that the methacrylate compounds are less than 50% by mole, particularly less than 30% by mole, based on the total of the methacrylate compounds and the acrylate compounds.

Illustrative of the compounds most preferably used as the protective surface layer-forming material are trimethylolethane triacrylate, trimethylolpropane triacrylate, pentaerythritol tetraacrylate and the like.

A synthetic resin article having a surface layer obtained from the above compounds is far superior in mar resistance compared with one having a thin surface layer obtained from dimethacrylate and the like, and does not become scratched at all when rubbed with the steel wool pad at a load of 1,000 g, particularly 3,000 g in an abrasion test. Amongst others, a synthetic resin article having a surface layer obtained from the most preferable compound, listed above, exhibits excellent mar resistance, i.e. in general it does not receive scratches at all even when rubbed with the steel wool pad at a load of 5,000 to 15,000 g.

Copolymerizable ethylenically unsaturated compounds, which may be used together with the acryloxy and/or methacryloxy groups-containing compound, include, for example, monoethylenically unsaturated compounds such as acrylic acid, methacrylic acid, alkyl esters of acrylic and methacrylic acids (the alkyl group having 1 to 4 carbon atoms), acrylonitrile, methacrylonitrile, styrene and their derivatives, and diethylenically unsaturated compounds such as diacrylate and dimethacrylate of an alkane diol having 2 to 6 carbon atoms, and diacrylate and dimethacrylate of diethylene glycol, triethylene glycol and tetraethylene glycol. These compounds may be used along or in combination.

Among the above compounds the more preferable are those which have one or two acryloxy or methacryloxy groups, such as for example alkyl acrylates or alkyl methacrylates, the alkyl group having 1 to 4 carbon atoms, and diacrylate or dimethacrylate of an alkane diol having 2 to 6 carbon atoms. These compounds are superior to other ethylenically unsaturated compounds in miscibility with the compound having at least three acryloxy and/or methacryloxy groups and other physical and chemical properties.

The copolymerizable mono- or diethylenically unsaturated compounds are used for the purposes of reducing viscosity of the polymerizable material when the polymerizable material is highly viscous, dissolving the polymerizable material when it is solid or imparting desirable physical properties to the protective polymer surface layer formed therefrom, such as shock resistance, flex strength, weather resistance and adhesion between the surface layer and the polymer body.

In the case where such ethylenically unsaturated compounds are used, preferably no more than 60% by weight their amounts should be no more than 80% by weight based on the total of the ethylenically unsaturated compound and the acryloxy and/or methacryloxy groups-containing compound.

In general, in order to provide a protective surface layer of the desired mar resistance, i.e. the mar resistance improved to an extent such that no appreciable mars are produced when rubbed with the steel wool pad at a load of 1,000 g, the polymerizable material should comprise:

i. at least 70% by weight of the three or more acryloxy and/or methacryloxy groups-containing compound and at most 30% by weight of the monoethylenically unsaturated compound, or ii. at least 20% by weight, preferably at least 40% by weight of the three or more acryloxy and/or methacyloxy groups-containing compound and at most 80% by weight, preferably at most 60% by weight of the diethylenically unsaturated compound.

When a mixture of the monoethylenically unsaturated compound and the diethylenically unsaturated compound is used, the amount of the mixture used should be between the (i) and (ii), defined above.

From a different standpoint, the polymerizable material can be expressed as one which should have a composition such that the total of the compound having three or more acryloxy and/or methacryloxy groups and a compound having two acryloxy or methacryloxy groups among the mono- or diethylenically unsaturated compound (signified as (b) above) occupies at least 40% by weight based on the weight of the polymerizable material.

Particularly, a mar resistance improved to a great extent such that no appreciable mars are produced when rubbed with the steel wool pad at a load of 3,000 g is obtained when the polymerizable material comprises at least 50% by weight of the acryloxy and/or methacryloxy groups—containing compound and at most 50% by weight of the diethylenically unsaturated compound.

The compound having at least three acryloxy and/or methacryloxy groups and the mixture thereof with the ethylenically unsaturated compound may be used either as they are or in a partially polymerized form.

The polymerizable material may be polymerized, for example, by heating the reaction mixture containing a heat-decomposable polymerization initiator or by applying ultraviolet rays to the reaction mixture containing a photosensitizer, or by applying γ-rays or other ionizing radiation. Amongst others most preferable is the application of ultraviolet rays.

The polymerization should preferably be carried out until the resulting polymer layer is hardened to an extent as great as possible, in order to provide the intended mar resistance. Accordingly, it is preferable to carry out the polymerization in a manner such that the reaction mixture is not in contact with oxygen.

A heat-decomposable polymerization initiator includes known radical polymerization initiators such as peroxides and azo compounds. A photosensitizer is preferably that which is capable of activating the polymerizable material at a wave length ranging from 3,000 to 4,000 A to produce the radical. An optimum photosensitizer is a carbonyl compound.

These initiators may be used alone or in combination with each other. In the case where inonizing radiation is applied in order to initiate the polymerization, electron beams irradiate at a total absorbed dose of 0.1 to 50 Mrad, using an accelerator having an acceleration voltage of 20 to 500 KV.

Preferable initiators exhibit enhanced activity for radical polymerization and include, for example, azobisisobutyronitrile, benzoyl peroxide, lauroyl peroxide, and benzoin and its alkyl ether, the alkyl group having at most 4 carbon atoms. The amount of initiator is not greater than 5%, preferably not greater than 3% and more preferably not greater than 2%, all by weight based on the weight of the polymerizable material. In the case where an initiator possessing very low activity for the radical polymerization is employed, the resulting polymer layer is poor in abrasion resistance due to the plasticizing function of the remaining unexpended initiator or the initiator residue, or it is difficult to obtain the desired degree of polymerization.

The polymerization conditions vary depending upon the particular polymerizable material, the particular polymerization initiator and the concentration of initiator.

When the polymerizable material coated on the inner surface of a mold is heated once to perform the polymerization and thereafter cooled, the resulting brittle film sometimes tends to come off the surface of the mold, against which care should be, therefore, taken.

A monomer used for the preparation of the polymer body of the shaped article includes, for example, lower alkyl esters of methacrylic acid such as methyl methacrylate; styrene, acrylonitrile and methacrylonitrile. These monomers may be used alone or as a mixture with each other or with another copolymerizable and castable monomer, or as a partially polymerized product thereof. Such comonomers include, for example, acrylic acid and methacrylic acid. The polymer body of the shaped article may also be made from polycarbonate resins such as those prepared by the condensation between a polyhydric alcohol, e.g. bisphenol A and phosgene. The manner whereby the monomer to be formed into the polymer body is polymerized is not critical, and the monomer may be polymerized in known manners using a polymerization initiator. As a polymerization initiator for the monomer, known radical initiators such as oil-soluble peroxides and azo compounds may generally be used. In particular, azobisisobutyronitrile, benzoylperoxide, etc. are preferable.

A preferable process for producing the synthetic resin shaped article of the present invention will be illustrated in detail.

A mixture of the polymerizable surface-layer forming material and a polymerization initiator is coated on the inner surface of mold members in a manner such that the mixture is spread uniformly in thickness and no air bubbles are left therein. The coating may be effected by spraying, brushing, flowing or dropping the mixture on the surface of conventional mold members made of, for example, stainless steel, nickel and chrome-plated metal, aluminum, inorganic glass and the like. Then, a film having little or not affinity for the polymer produced from the coated material is made to adhere closely to the coated material while ensuring that no air bubbles are left therebetween, in order to prevent the polymerizable material from coming into contact with oxygen. Then, the polymerizable material is polymerized to an extent such that the polymerized material is not swollen with or dissolved in a monomer to be formed into the polymer body. It would be possible for the purpose of polymerization only to keep the mold members, whereon the polymerizable material is coated, in an inert gas atmosphere to prevent the material from coming into contact with oxygen without the use of the film. However, the use of such a covering film is far more advantageous, because not only is the influence of oxygen excluded but also the coated material is completely prevented from agglomerating into the form of drops either immediately after coating or during polymerization. Therefore, the use of a film is advantageous from an industrial viewpoint and particularly suitable for the production of large size articles. In accordance with the present invention, no extender is required to be added and hence there are no disadvantages in the addition of same. It is preferred that the film is tentered after being made to adhere closely to the polymerizable material and maintained in the same state until the completion of polymerization, in order to form a coated surface layer having a smooth surface. The resulting shaped article exhibits no optical distortion, which distortion results from the difference in refractive index between the protective polymer surface layer and the polymer body. In the case where a heat-shrinkable film is used, the above effect can easily be achieved merely by heating instead of tentering.

The film to be made to adhere closely to the coated material may be suitably selected depending upon the particular polymerization method. In general, preferable films include those of polyester, polyvinyl alcohol, regenerated cellulose (cellophane or moisture-proof cellophane), polyethylene, polypropylene, polyvinyl chloride, polyvinylidene chloride, polyamide, teflon, cellulose diacetate, cellulose triacetate and the like. When the polymerization is performed by heating, films of polyester are preferably used. When the polymerization is performed by the irradiation of ultraviolet rays, films of polyester, cellophane, polyvinyl alcohol, polypropylene, polyvinyl chloride and the like are preferably used. When the polymerization is performed by the irradiation of electron beams, films of polyester are preferably used. These films have little or no affinity for the polymerizable coating material employed and the polymerization product thereof. Therefore, when the film is peeled off after the completion of polymerization of the coated material, a thin layer of polymerization product does not come off the surface of the mold.

In order to control the adhesion of the coated material to the surface of a mold, a minor amount of a compound selected from releasing agents such as Aerosol OT (made by American Cyanamid Co., the main ingredient being sodium dialkylsulfosuccinate) and liquid paraffin, various organic and inorganic acids and hydroxy compounds may be added to the coating material. Other additives such as antistatic agent, ultraviolet absorber, colorant and the like may also be added.

The thickness of the polymerized material is within the range from 0.001 to 0.5 mm, preferably from 0.003 to 0.1 mm, and more preferably from 0.005 to 0.1 mm. If it is too thin, the resulting cast article having such a polymer surface layer tends to become scratched when subjected to a severe abrasive force. Further, it is difficult to prepare a uniform layer of the polymerized material. By contrast, when the thickness is in excess of the upper limit, the abrasion-resistant layer forming polymerizable material suddenly decreases in volume during the polymerization thereof, and this results in a product having cracks on the surface and being optically distorted.

The coated material should be sufficiently polymerized, i.e. to such an extent that the polymerized material is not swollen with or dissolved in the monomer to be formed into polymer body. When the coated material is not sufficiently polymerized, i.e. a layer of the polymerized material is in a gel state or in a state such that the layer is swollen with the monomer to be formed into the polymer body, the resulting shaped article has a rough or wrinkled surface because the thin layer of the polymerized material becomes cracked or comes off the inner surface of the mold during the polymerization of the monomer for the polymer body, or the shaped article lacks uniformity in optical properties and is inferior in abrasion resistance because the thin layer is buried in the polymer body. These defects are fatal from a commercial point of view, particularly to a transparent shaped article such as for example polymethylmethacrylate.

Even when the coated material is polymerized to a great degree, the adhesion of the surface thin layer to the base resin is still great. Therefore, the protective surface layer is not separated from the base resin when the shaped article is subjected to the cross cut adhesive cellophane tape test, hereinafter set forth.

The mold members, on the inner surface of which a thin polymer layer thus formed by polymerization of the coated material is closely adhered, are assembled into a mold wherein the inner surfaces of the mold members stand face to face with each other. The most preferable mold member is a tempered plate glass.

A process for spreading a polymerizable material and polymerizing the same to form a surface layer of abrasion resistance on a mold member may be carried out in a continual manner. A continual process is far more advantageous from an industrial point of view because the process reduces labour requirements and ensures uniformity in properties of the resulting surface layers and, therefore, permits mass production.

Preferable processes and apparatus for the production of the shaped article will be illustrated in detail with reference to the drawings.

Figure 2:
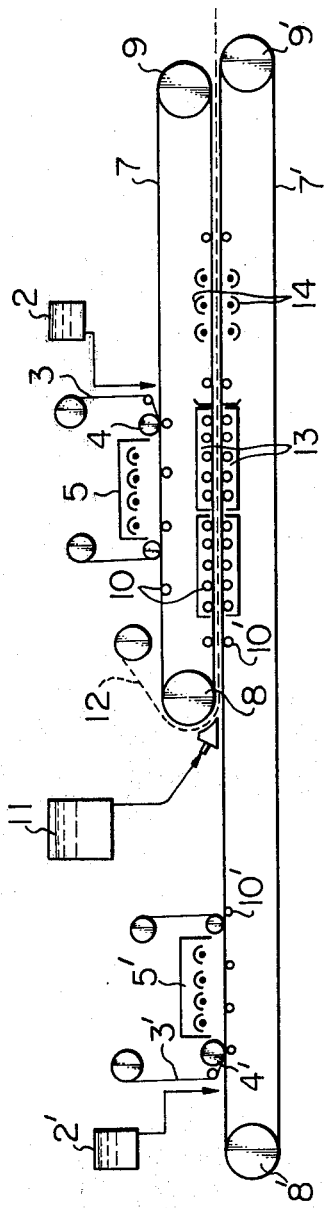
Figure 3:
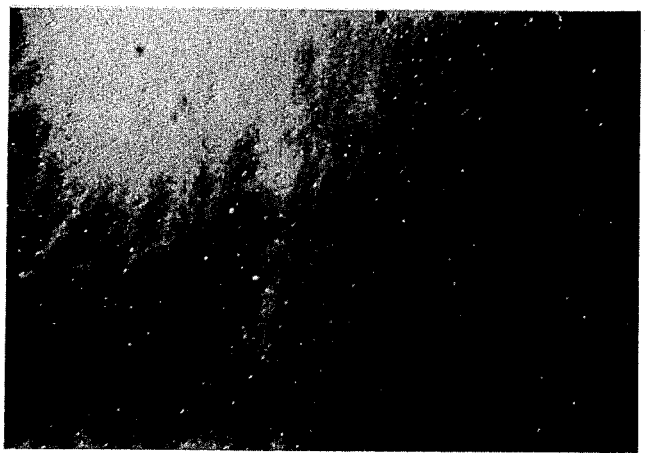
Figure 4:

FIG. 1 schematically shows a process for continuously forming the mar resistance polymer surface layer on a plurality of mold members;

FIG. 2 schematically shows a process for continuously preparing the cast article by using a pair of endless belts as a mold; and, FIGS. 3 and 4 are microphotographs of the surfaces of the shaped article of the present invention and of the comparative example, respectively.

In FIG. 1, a plurality of mold members A such as made of tempered plate glass are continuously moved in a row at stated intervals while being supported by a conveyor means 1 such as rollers or a belt (not shown). A polymerizable material is fed from a reservoir 2 through a metering pump and uniformly spread onto the mold member A by a suitable means such as a roller coater, a flow coater or a spray. An endless polymer film 3 which continuously moves at the same speed as that of the mold member is made to closely adhere to the spread surface by press roller 4 having a surface layer of sponge-like soft rubber. At the same time, the thickness of the spread material is made uniform and air bubbles are forced out from the material by the press roller 4. In order to force out the air bubbles completely and to prevent the mold member from remaining partially uncoated, it is preferable to first overspread the material onto the mold member and then press out the excess material by the press roller. But, the material may be firstly spread onto a film and then made to adhere closely to the mold member, which process depends upon the viscosity of the material, inclination of the surface of the mold member and the method whereby the film is made to adhere closely to the mold member. The mold member B having the spread material thereon is then moved into a polymerization chamber 5 where the material 15 between the mold member and the film is polymerized to an extent such that the polymerized material is not swollen with or dissolved in a monomer to be formed into the polymer body. The polymerization chamber 5 may be ventilated to control the temperature and to discharge harmful gas. In the first zone ranging from the point at which a polymer film is made to adhere closely to the mold member to the point at which the polymerization is in an advanced stage, i.e. the film, the polymerized material and the mold member are fixed together, the film tends to become creased and, on rare occasions, air penetrates from the circumference of the mold member due to a slight disturbance in alignment between the continuous film and the mold members arranged in a row at stated intervals, and results in a cast plate having a rugged surface and therefore reduced optical, mechanical and thermal properties. Therefore, it is preferred in the above first zone to stretch the film in the lateral direction by grasping it at both edges by a tensioning device and in the longitudinal direction by applying a slight brake force to the feed roller and to adjust the balance between the tensions in both directions. In the case where a heat-shrinkable film is used, the tension is readily generated merely by firmly grasping both the edges and heating the film.

After the polymerization is completed, the polymer film 3 is continuously peeled off from the polymerized material closely adhering to the mold member, by a take-up roller 6. In the embodiment shown in FIG. 1, the endless film 3 continuously circulates by way of tensioning rollers 16 to the first spreading zone. Alternatively, a continuous film may be fed from a feed roller to a winding roller. A device for removing stains and creases from the film may be attached to the continual production apparatus.

In the above process, all the mold members should have the same width, but need not have the same length. It is possible to decrease the distance between the adjacent mold members. The conveyer may be driven in a continuous manner as illustrated above or in an intermittent manner. In the latter case, the movable parts of the polymerization apparatus may be synchronized with the conveyer movement.

A mixture of a monomer to be formed into the polymer body and a polymerization initiator is then charged into the mold. The most preferable monomer for base resin to be used in the present invention is methyl methacrylate or a monomer mixture containing at least 70% by weight of methyl methacrylate. These may be used as a partial polymerization product. As comonomers to be preferably used in admixture with methyl methacrylate, methacrylic acid, lower alkyl esters of methacrylic acid and acrylic acid, styrene and the like are suitable. To the monomer mixture, additives such as plasticizer, fire retardant, colorant, ultraviolet absorber, etc. may be added, if desired.

The polymerization of the monomer is usually carried out at a temperature of 30° to 150°C in a well-known manner as decribed for example in U.S. Pat. No. 3,087,197. After the completion of polymerization, the mold is released to obtain a synthetic resin cast plate having a thin synthetic resin surface layer of improved abrasion resistance. The surface of the cast plate reproduces precisely the inner surface of the mold member and is not rugged or wrinkled. Therefore, the mold can be readily released from the cast plate.

The synthetic resin shaped article of the invention may be continuously produced using a continuous production equipment. A continuous production equipment principally comprises an apparatus for polymerizing a monomeric material to be formed into the polymer body comprising a pair of endless belts as a mold member. At one end of the endless belts which are facing each other and continuously moving, the monomeric material is charged therebetween and polymerized while the endless belts move and, at the other end of the endless belts, a plate-like synthetic resin cast article is separated therefrom. In addition to the apparatus for polymerizing a monomeric material to be formed into the polymer body, the continuous production equipment preferably comprises an apparatus for forming a synthetic resin surface layer of abrasion resistance on at least one surface of the two endless belts before the monomeric material is charged between the endless belts.

The main part of the apparatus for polymerizing a monomeric material to be formed into the polymer body comprises endless belts, pulleys, a tension-generating means, a driving means, a monomer-feeding means, a gasket-feeding means, a heating means for polymerizing the monomeric material and controlling the thickness of the polymerized material, and a supporting means. The main part of the apparatus for forming a synthetic resin surface layer comprises a means for spreading a polymerizable material, a means for hardening the spread material and, if desired, a means for preventing the spread material from coming in contact with oxygen.

In the practice of continuous production, a polymerizable material and, if required, a polymerization initiator are uniformly spread onto at least one surface of the two endless belts by a suitable spreading means such as a roll coater, a flow coater, a spray, a brush or the like. The spread material is then polymerized, preferably in a state such that the material is not in contact with oxygen. In order to prevent the spread material from coming in contact with oxygen, it is preferred to place a part of the endless belts continuously moving, in an atmosphere of inert gas. However, this method offers several problems, e.g. a perfect seal between the belt and the sealing member is very difficult, and volatile compound contained in the spread material inevitably evaporates, and a great amount of inert gas is required. Therefore, it is advantageous to make adhere closely thereto a film having little or no affinity for the spread material.

The step of forming the synthetic resin layer of abrasion resistance is usually carried out on a horizontal part of the endless belt. However, this step may be carried out on the part where the endless belt moves slopewise, depending upon the viscosity and the thickness of the material to be spread thereon and upon whether a film is used or not to prevent the material from coming in contact with oxygen. In the latter case, as the synthetic resin layer so formed has a high crosslinking density and is brittle, the layer sometimes separates from the belt or forms cracks therein due to deformation and bending of the belt. Therefore, care should be taken regarding the curvature of pulleys and rollers supporting the belt or change of the temperature thereof.

The polymerization of the monomeric material to be formed into the polymer body is carried out in the following manner. A pair of endless belts continuously moving at the same speed as each other, each one surface of the pair of belts on which a synthetic resin layer of abrasion resistance has been formed facing the other and continuously moving in the same direction, and two gaskets located at the edges of both the endless belts and in contact with both endless belts are assembled into a polymerization cell. Through an opening located at one end of the polymerization cell, a liquid monomeric material is continuously charged into the space defined by the polymerization cell. After the monomer is continuously polymerized with the distance between the two surfaces of the endless belts being maintained constant, the polymerized material is continuously peeled off from the two belts at an opening located at the other end of the polymerization cell. The resulting synthetic resin cast plate has surface layers of abrasion resistance, integrated with the polymer body.

Instead of spreading the polymerizable material onto both surfaces of the pair of endless belts, it is also possible to spread the material onto either one surface of each of the two belts thereby producing a cast plate having only one surface layer of abrasion resistance.

A preferable endless belt is made of metal such as steel and stainless steel and has a thickness of 0.1 to 3 mm, particularly 0.5 to 2 mm. An endless belt made of burnished stainless steel is most preferable because it produces a cast plate having an attractive appearance. A liquid monomeric material to be formed into the polymer body may be directly poured through a feed duct inserted at the opening of the polymerization cell or through a dropping funnel onto the endless belt.

In general, a gasket used in this process is made of plastic and in the form of a rod or tube. A gasket having a square or rectangular cross section may be used, particularly in the case where a monomeric material of a low viscosity is used, to ensure a perfect seal between the gasket and the belts. A hollow tubular gasket may be used in the case where a monomerpolymer mixture to be formed into the polymer body having a high viscosity is used.

The polymerization temperature may be maintained constant all over the polymerization zone or varied stepwise or in a continuous manner. The polymerization temperature varies depending upon the particular polymerization initiator, but it should be maintained below the boiling point of the monomer until the greater part of polymerization is completed. After the completion of the greater part of polymerization, it is advantageous to raise the temperature considerably, but not to the temperature at which degradation of the polymer occurs, to complete the polymerization. The heating of the polymerization zone may be carried out, for example, by blowing hot air against the outside, by spraying hot water on the outside, by making the belts travel through a hot water bath or by using an infrared heater.

In order to maintain the surfaces of the endless belt horizontal and control the thickness of the resulting cast plate at the polymerization zone, a plurality of idle rollers may be provided to support the belt or the belt may be made to slide on a smooth solid surface.

FIG. 2 is one preferable embodiment of the apparatus for continuously producing a synthetic resin cast article. In FIG. 2, a pair of endless belts 7, 7' continuously moving at the same speed as each other while being stretched by pulleys, 8, 9 and 8', 9', are kept horizontal by a plurality of idle rollers 10, 10'. Two polymerizable materials for surface layers are separately fed from reservoirs 2, 2' through metering pumps (not shown in FIG. 2) and spread onto the surfaces of the belts 7, 7', respectively. Two polymer films 3, 3' continuously moving at the same speed as those of the belts 7, 7' are separately made to closely adhere to the spread surfaces by press rollers 4, 4' each having a surface layer of sponge-like soft rubber, respectively. At the same time, the thickness of the spread material is made uniform and air bubbles are forced out from the material by the press rollers 4, 4'. The films 3, 3' are continuously drawn out from two feed rollers, respectively. The films made to closely adhere to the spread material are uniformly stretched in the longitudinal direction by applying a slight braking force to the feed rollers and in the lateral direction by a tenter (not shown). The spread materials are polymerized to become hard while being passed through hardening apparatus 5, 5'. Then, the films 3, 3' are peeled off from the polymerized, thus hardened spread materials downstream of the hardening apparatus 5, 5'.

A monomer to be formed into the polymer body is fed from a reservoir 11 through a metering pump (not shown in FIG. 2) and an injector into the space between the belt surfaces onto which the polymerized materials have closely adhered, and at the same time, gaskets 12 are fed between both edges of the belts 7, 7' to seal the edges of the belts. The first half part 13 of the polymerization zone is heated by spraying hot water onto the outside and the second half part thereof is heated by far infrared heaters 14 and hot air heaters. At the end of the belts, the cast plate having a surface layer of improved abrasion resistance is continuously peeled off from both belts.

In another preferable embodiment, the synthetic resin shaped article can be obtained, without the use of a mold, by a process comprising the steps of directly spreading a polymerizable coating material, which is the same as that described above, onto all or part of the surface of a synthetic resin shaped article which has previously been manufactured, and then polymerizing the polymerizable material, preferably in a manner such that the material is not in contact with oxygen. This process is simple, but care should be taken so as to obtain a product of a smooth surface. In this process, the choice of the polymerizable coating material, the step of coating the surface of a shaped article therewith, the step of preventing contact with oxygen and the step of polymerizing the coated material may also be performed in the same manner as that described involving the use of a mold.

The protective surface layer formed on the polymer body of the shaped article is superior in smoothness, luster and transparency as well as mar resistance. Therefore, it is advantageously used as a protective surface layer for transparent shaped articles such as those made of polymethyl methacrylate, a methyl methacrylate copolymer and polycarbonate. Illustrative of the shaped articles, on which the protective surface layer is to be formed, are lenses for sunglasses, fashion-glasses and other glasses, wristwatches, cameras, microscopes, telescopes and magnifying glasses; lenses for welder's helmets and gas masks; phonograph covers; and protector plates for tape recorder indicator meters, radio dials and other various gauges and meters; mirrors; and car window glasses.

The invention will be further illustrated, but is not intended to be limited, by the following examples in which parts and percentages are by weight unless otherwise specified.

In the examples, mar resistance of the protective surface layer and adhesion between the protective surface layer and the polymer body were tested by the following methods.

i. Mar resistance — Sand dropping method

A specimen is clipped at an incline of 45° to the horizontal direction and rotated at a speed of 11 r.p.m. around a vertical axis. 300 g of 60 mesh carborundum particles are dropped at a rate of 150 g/min from a hopper located at a height of 70 cm above the specimen. The mar value is expressed as the value of the difference between the hazes after the dropping of carborundum particles and before the dropping thereof, wherein the haze is calculated by the equation;

$$\text{Haze } (\%) = \frac{\text{Total luminous transmittance} - \text{Parallel luminous transmittance}}{\text{Total luminous transmittance}} \times 100$$

ii. Mar resistance— Steel wool pad rubbing method

A pad of 25 mm diameter composed of No. 000 steel wool is rotated 100 revolutions at a rate of 40 r.p.m. while being pressed against the specimen at a predetermined load. Scratches produced on the specimen are examined with the naked eye.

iii. Adhesion— Crosscut cellophane tape peeling-off method

Using a stylus, 11 parallel incised lines are drawn at intervals of 1 mm in each of the lengthwise and breadthwise directions on a specimen, each incised line having a depth larger than the thickness of the protective surface layer of the specimen, thereby to form a gridiron pattern composed of 100 squares each being of a 1 mm² size. A self-adhesive cellophane tape is applied onto the gridiron pattern, and then, peeled off therefrom by one quick pull. Adhesion between the protective surface layer and the polymer body can be expressed by the number of squares of the protective surface layer separated from the polymer body.

EXAMPLE 1

100 parts of trimethylolpropane triacrylate were mixed with 2 parts of benzoin methyl ether as photosensitizer and spread on one surface of a glass plate. The spread material was covered with a polypropylene film of 0.018 mm thickness. The polypropylene film was pressed with a roller so that no air bubbles were left between the film and the glass plate, and the thickness of the spread material was made approximately 0.03 mm. Using an irradiation apparatus with 20 watt chemical lamps of approximately 58 cm length having a dominant wave length of approximately 3650 A arranged at 5 cm intervals, the spread material was irradiated at a distance of 7 cm directly below the chemical lamps for 4 minutes to perform polymerization. Then, the polypropylene film was peeled off therefrom, and only the completely polymerized trimethylolpropane triacrylate layer was left to adhere to the surface of the glass plate.

Two sheets of the glass plate thus prepared were made to stand so that the two polytrimethylolpropane triacrylate layers were face to face with each other, and the space between the two glass plates was filled with a partially polymerized methyl methacrylate syrup containing 0.05% of azobisisobutyronitrile (referred to hereinafter as "AIBN" for brevity). After sealing the circumference of the glass plates with a plasticized polyvinyl chloride gasket, the interval between the two glass plates was adjusted exactly to 3 mm. Thereafter, the polymerization cell was maintained at a temperature of 60°C for 6 hours and further at a temperature of 120°C for 2 hours to perform polymerization. After cooling the cell, the resultant methyl methacrylate resin cast plate was separated from the glass plates. The thin polytrimethylolpropane triacrylate layers came off from the glass plates, i.e. they had been firmly adhered to the methyl methacrylate resin cast plate. The methyl methacrylate resin cast plate had attractive surfaces free from wrinkles, unevenness and optical distortion.

The mar value of the cast plate thus manufactured was 11%, whereas that of a methyl methacrylate resin cast plate manufactured in the same manner except that such a protective surface layer was not adhered thereto was 55%.

EXAMPLE 2

A mixture of 80 parts pentaerythrithol tetraacrylate and 20 parts methyl methacrylate was mixed with 1.5 parts of benzoin methyl ether and 0.2 part of AIBN, and spread on one surface of a burnished steel plate. The spread material was covered with a polypropylene film of 0.018 mm thickness. The polypropylene film was pressed with a roller, pressing out air bubbles from the layer, so that the polypropylene film was made to adhere closely to the spread material and the thickness of the spread material was made approximately 0.02 mm. Using the same irradiation apparatus and under the same conditions as those of Example 1, ultraviolet rays were applied to the spread material for 4 minutes to perform polymerization. The polypropylene film was then peeled off therefrom, and only the completely polymerized resin layer was left to adhere onto the surface of the steel plate.

Two sheets of the steel plate thus prepared were made to stand so that the two thin resin layers were face to face with each other, and the space between the two steel plates was filled with a partially polymerized methyl methacrylate syrup containing 0.05% of AIBN. After sealing the circumference of the steel plates with a plasticized polyvinyl chloride gasket, the interval between the two steel plates was adjusted exactly to 3 mm. Thereafter, the mold was maintained at a temperature of 60°C for 6 hours and further at a temperature of 120°C for 2 hours to perform polymerization. After cooling the mold, the resultant methyl methacrylate resin cast plate was separated from the steel plates. The thin resin layers came off from the steel plates, i.e. they had been firmly adhered to the methyl methacrylate resin cast plate. The case plate had attractive surfaces free from wrinkles, unevenness and optical distortion. The mar value of the case plate was 13%.

EXAMPLE 3

A mixture of 60 parts trimethylolethane triacrylate and 40 parts of polyethylene glycol dimethacrylate having an average molecular weight of 600 was mixed with 2 parts of benzoin ethyl ether spread on one surface of a glass plate. The spread material was covered with a polyester film of 0.025 mm thickness. The polyester film was pressed with a roller so that no air bubbles were left between the film and the glass plate, and the thickness of the spread material was made approximately 0.03 mm. Using the same irradiation apparatus and under the same conditions as those of Example 1, the spread material was irradiated for 4 minutes to perform the polymerization. The polyester film was then peeled off therefrom and only the completely polymerized resin layer was made to adhere onto the surface of the glass plate.

Two sheets of the glass plate so prepared were made to stand so that the two resin layers were face to face with each other, and the space between the two glass plates was filled with partially polymerized product of a mixture of 90 parts methyl methacrylate and 10 parts methyl acrylate, which product contained 0.05% of AIBN. After sealing the circumference of the glass plates with a plasticized polyvinyl chloride gasket, the interval between the two glass plates was adjusted exactly to 3 mm. Thereafter, the mold was maintained at a temperature of 60°C for 6 hours and further at a temperature of 120°C for 2 hours to perform polymerization. After cooling the mold, the resultant methyl methacrylatemethyl acrylate resin cast plate was separated from the glass plates. The thin resin layers had been firmly adhered to the resin cast plate. The resin cast plate so manufactured had attractive surfaces free from wrinkles, unevenness and optical distortion. The mar value of the resin cast plate was 12%, whereas that of a cast plate manufactured from the same resin in the same manner as the above except that such a thin resin layer was not adhered thereto was 57%.

The above procedure was repeated wherein two sheets of glass plate, one of which had the same thin resin layer, adhered thereto, as that described above and the other of which had no thin resin layer, were made into a polymerization cell with all other conditions remaining substantially the same. Thus, a resin cast plate exhibiting an improved abrasion resistance on only one side thereof could be obtained.

EXAMPLE 4

Trimethylolpropane triacrylate was spread over one surface of a steel plate. The spread material thus formed was covered with a polyester film of 0.025 mm thickness. Then, the polyester film was pressed with a roller so that no air bubbles were left between the film and the steel plate, and the thickness of the spread material was made approximately 0.02 mm. Using a 300KV electron beam accelerator, the spread material was irradiated with electron beams at a dose rate of 5.6 M rad/sec and a total absorbed dose of 16 M rad to perform the polymerization. The polyester film was then peeled off therefrom.

Two sheets of the steel plate so treated were made to stand so that the two resin layers were face to face with each other to form a polymerization cell. Using the polymerization cell, a methyl methacrylate resin cast plate was prepared in the same manner as that described in Example 2. The mar value of the methyl methacrylate resin cast plate was 10%

EXAMPLE 5

A mixture of 40 parts trimethylolpropane triacrylate and 60 parts methyl methacrylate was mixed with 0.2 part of AIBN and 0.05 part of Tinuvin P (ultraviolet absorber, 2-(2'-hydroxy-5'-methylphenyl)benzotriazole, made by Geigy, Swiss), and spread on one surface of a glass plate. The spread material was covered with a polyester film of 0.025 mm thickness. The polyester film was pressed with a roller so that no air bubbles were left between the film and the glass plates, and the thickness of the spread material was made approximately 0.02 mm. The glass plate thus treated was maintained at a temperature of 70°C for 1 hour and further at a temperature of 100°C for 2 hours, in an air oven to polymerize the monomer mixture. The polyester film was then peeled off therefrom and only the completely polymerized resin layer was made to adhere onto the surface of the glass plate.

Two sheets of the glass plate so treated were made to stand so that the two resin layers were face to face with each other to form a polymerization cell. Using the polymerization cell, a methyl methacrylate resin cast plate was prepared in the same manner as that described in Example 1. The resultant methyl methacrylate resin cast plate had attractive surfaces free from wrinkles, unevenness and optical distortion, and the mar value of 21%.

EXAMPLE 6

The procedure of Example 1 was repeated wherein a mixture of 70 parts of pentaerythritol tetraacrylate, 25 parts of 1,6-hexanediol diacrylate, 5 parts of 2-hydroxyethyl methacrylate and 1 part of benzoin methyl ether was used as a polymerizable coating material for thin surface layers with all other conditions remaining the same. The methyl methacrylate resin cast plate thus manufactured had attractive surfaces free from wrinkles, unevenness and optical distortion, and the mar value of 9.0%.

EXAMPLES 7 – 10

The procedure of Example 1 was repeated wherein the various monomers and polymerization conditions of the monomers were employed for the preparation of the polymer bodies, as shown in Table 1 with all other conditions remaining the same. All the resin cast plates thus manufactured had attractive surfaces free from wrinkles, unevenness and optical distortion, and the mar value of 10 to 11%.

Table 1

| Conditions | Example No. | | | |
|---|---|---|---|---|
| | 7 | 8 | 9 | 10 |
| Monomer mixture to be formed into polymer body, in parts | MMA*1 90, Methacrylic acid 10 | MMA 75, Phosgard C-22-R*2 25 | MMA 70, Styrene 30 | Styrene 70, Acrylonitrile 30 |
| Polymerization initiator for the monomer mixture in parts | AIBN 0.05 | AIBN 0.1 | AIBN 0.05 | AIBN 0.1 |
| Polymerization conditions, temp., in °C × time, in hours | 60°C × 20h + 120°C × 2h | 60°C × 16h + 100°C × 2h | 50°C × 16h + 120°C × 2h | 50°C × 20h + 110°C × 2h |
| Mar resistance of polymer body, *3 in percent | 52 | 68 | 66 | 72 |

*1 MMA: Methyl methacrylate
*2 Phosgard C-22-R: Flame retardant agent, chlorinated polyphosphonate, made by Monsanto Chem.
*3 Comparative date (mar value of a cast plate having no polytrimethlolpropane triacrylate protective surface layer)

EXAMPLE 11

Trimethylolpropane triacrylate was uniformly spread at a thickness of approximately 0.02 mm over one surface of a polymethyl methacrylate plate having a 5 mm thickness. The surface of polymethyl methacrylate plate thus treated was irradiated with electron beams at a dose rate of 5.6 M rad/sec and a total absorbed dose of 16 M rad using a 300 KV electron beam accelerator to polymerize the trimethylol propane triacrylate.

The resultant plate exhibited excellent mar resistance, and scratch resistance. Adhesion of the thin trimethylolpropane triacrylate resin layer to the base plate was very strong.

EXAMPLE 12

A mixture of 70 parts of pentaerythritol tetraacrylate and 30 parts of 1,6-hexanediol diacrylate was uniformly spread at a thickness of approximately 0.02 mm over one surface of a polycarbonate plate and one surface of a polystyrene base plate, both plates having a 2 mm thickness. The surfaces of both the plates thus treated were irradiated in the same manner as that of Example 11.

Both the plates thus treated exhibited an excellent mar resistance and scratch resistance. Adhesion of the thin resin surface layer to both the plates was very strong.

EXAMPLE 13

A synthetic resin surface layer was formed on a tempered glass plate in accordance with the process illustrated in FIG. 1. Tempered glass plates each having a thickness of 10 mm, a width of 1,420 mm and a length of 1,168 mm were continuously moved at a speed of 0.5 m/min by a conveyer with distances between the adjacent glass plates of approximately 150 mm.

A mixture of 60 parts of trimethylolpropane triacrylate, 30 parts of bis-(ethylene glycol)phthalate dimethacrylate, 10 parts of methyl methacrylate, 2 parts of benzoin methyl ether and 0.1 part of AIBN was continuously flowed through a metering pump and spread on the glass plate (A). A polyester film 3 having a thickness of 0.018 mm and a width of 1,600 mm, while being stretched by a clip tenter and moved at the same speed as that of the glass plate, was made to closely adhere to the spread surface by a press roller 4 in a manner such that the spread material had a uniform thickness of approximately 0.03 mm and air bubbles were forced out from the spread material. Then, the spread material was passed through a polymerization zone where chemical lamps having a dominant wave length of approximately 3650 A were arranged at a height of approximately 70 cm from the spread surface extending over 3 m, to be hardened thereby. Then the polyester film was peeled off from the polymerized material.

Two sheets of the glass plate so treated were stood so that the two resin layers were face to face with each other, and the space between the two glass plates was filled with a partially polymerized product of methyl methacrylate which product contained 0.05% of AIBN. After sealing the circumference of the glass plates with a plasticized polyvinyl chloride gasket, the distance between the two glass plate was adjusted to 3 mm. Thereafter, the mold was maintained at a temperature of 60°C for 6 hours and at a temperature of 120°C for a further 2 hours to perform polymerization. After cooling the mold, the resultant methyl methacrylate resin cast plate was separated from the glass plates. The thin resin layers had firmly adhered to the base resin. The cast plate had attractive surfaces free from wrinkles, unevenness and optical distortion. The mar value of the cast plate was 13%.

EXAMPLE 14

An apparatus shown in FIG. 2 was used. Two burnished stainless steel endless belts 7, 7' each having a thickness of 1 mm and a width of 1,200 mm were continuously moved, while being stretched by the main pulleys 8, 9 and 8', 9' each having a diameter of 1,500 mm respectively, at a speed of 0.5 m/min by driving the main pulley 9'. The lower belt 7' was 10 m longer than the upper belt 7. The initial tension, 10 kg per mm² of cross-sectional area of the belt, was applied by oil pressure cylinders provided in the main pulleys 8, 8'.

Two mixtures of 60 parts of trimethylolpropane triacrylate, 30 parts of bis-(ethylene glycol)phthalate dimethacrylate, 10 parts of methyl methacrylate, 2 parts of benzoin methyl ether and 0.1 part of AIBN were continuously flowed through metering pumps and spread on both surfaces of the two endless belts 7, 7', respectively. Polyester films 3, 3' of 0.012 mm thickness, while being stretched by clip tenters and moved at the same speed as those of the endless belts, were continuously drawn out from the feed rollers and made to closely adhere to the spread surfaces at the same speed as those of the endless belts by press rollers 4, 4' in a manner such that the spread material had a uniform thickness of approximately 0.03 mm and air bubbles were forced out from the material. Then, each of the spread materials passed through a polymerization zone where chemical lamps having a dominant wave length of approximately 3650 A were arranged at a height of approximately 70 cm from the belt surface and at 5 cm intervals extending over 3 m, to be hardened thereby. Then, the films were continuously peeled off from the polymerized materials each closely adhering to the belt surface and taken up by winding rollers. The belts were suitably supported by a plurality of idle rollers 10, 10' arranged extending over the zones where surface layers of the polymerized material were formed.

Then, a monomer mixture containing 80 parts of methyl methacrylate, 20 parts of polymethyl methacrylate having a polymerization degree of approximately 900 and 0.02 part of azobisdimethylvaleronitrile was continuously fed from a metering pump through an injection device into the space between the belt surfaces onto which the polymerized materials was adhered. At the same time, hollow tubular gaskets 12 made of polyvinyl chloride resin containing an appropriate amount of plasticizer were fed between both edges of the belts 7, 7'. The polymerization zone was extended over 60 m, at the first 40 m part of which a plurality of idle rollers 10, 10' were arranged at 300 mm intervals to control precisely the distance between the belt surfaces facing each other and heating was performed by spraying water of 70°C from a nozzle onto the outside, and at the second 20 m part of which a plurality of idle rollers 10, 10' were arranged at 2 m intervals to support the belt and the belt was heated at a temperature of approximately 120°C using an infrared heater and a hot air oven. After being cooled, a cast plate of 3 mm thickness was continuously peeled off from the belts, which had no optical distortion and a smooth surface layer of excellent abrasion resistance closely adhered to the base resin. The mar value of the cast plate was 13%.

EXAMPLES 15 – 20

Polymerizable compositions each composed of 100 parts of a monomer mixture as shown in Table 2 and 2 parts of benzoin butyl ether were separately spread at a thickness of 0.03 mm over an outer surface of each polymethyl methacrylate wristwatch crystal prepared by an injection molding procedure. Using an irradiation apparatus with 20 watt chemical lamps of approximately 58 cm length having a dominant wave length of approximately 3650 A arranged at 5 cm intervals, the polymerizable compositions were irradiated in an atmosphere of nitrogen at a distance of 7 cm directly below the chemical lamps for 4 minutes to perform polymerization. The plates each having a protective surface layer had mar values as shown in Table 2.

Table 2

| Example No. | Monomer Mixture (%) | Mar value (%) |
| --- | --- | --- |
| 15 | 5E4A/MA/AA = 80/10/10 | 10 |
| 16 | TME3A/C$_6$DA = 50/50 | 11 |
| 17 | 5E4A/C$_4$DA = 30/70 | 12 |
| 18 | TMP3A/4EDMA/MAA = 60/30/10 | 13 |
| 19 | TMP3A/MEPH = 80/20 | 12 |
| 20 | TMP3A/TMP3MA/C$_6$DA = 40/40/20 | 11 |

5E4A: Pentaerythrithol tetraacrylate
TME3A: Trimethylolethane triacrylate
TMP3A: Trimethylolpropane triacrylate
TMP3MA: Trimethylolpropane trimethacrylate
MA: Methyl acrylate
AA: Acrylic acid
C$_6$DA: Hexamethylenediol diacrylate
C$_4$DA: Butanediol diacrylate
4EDMA: Tetraethylene glycol dimethacrylate
MAA: Methacrylic acid
MEPH: Bis-ethylene glycol-phthalate dimethacrylate The products obtained in the above Examples were tested for their adhesion between the respective surface layers and the polymer bodies. No separations of gridiron squares were observed in any products. The products were also tested for their mar resistance by a steel wool pad rubbing method. Results are shown in Table 3.

Table 3

| Example No. | Mar resistance at a load of | | | | | |
| --- | --- | --- | --- | --- | --- | --- |
| | 500 g | 1.0 kg | 3.0 kg | 5.0 kg | 10.0 kg | 15.0 kg |
| 1 | | | | | VG | G |
| 2 | | | | VG | G | |
| 3 | | VG – G | P | | | |
| 4 | | | | | VG | G |
| 5 | | G | P | | | |
| 6 | | | | | VG | G |
| 7 | | | | | VG | G |
| 8 | | | | | VG | G |
| 9 | | | | | VG | G |
| 10 | | | | | VG | G |
| 11 | | | | | VG | G |
| 12 | | | | | VG | G |
| 13 | | VG – G | P | | | |
| 14 | | VG – G | P | | | |
| 15 | | | | VG | G | |
| 16 | | VG | G | | | |
| 17 | VG | VG – G | | | | |
| 18 | | VG | VG – G | | | |
| 19 | | | VG | G | | |
| 20 | | | VG | G | | |

Comparative *1    VP (10 g)
         " 2     VG (10 g), G (100 g), P (1.0 kg)

Table 3-continued

| Example No. | Mar resistance at a load of. | | | | | |
|---|---|---|---|---|---|---|
| | 500 g | 1.0 kg | 3.0 kg | 5.0 kg | 10.0 kg | 15.0 kg |
| " 3 | VG (10 g), G (100 g), P (1.0 kg) | | | | | |

VG: No scratches were observed
G: Slight scratches were observed
P: Some fair-sized scratches were observed
VP: Many fair-sized scratches were observed.
Comparative Example 1: A polymethyl methacrylate cast plate having no protective polymer surface layer.
Comparative Examples 2 and 3: Polymethyl methacrylate cast plates each having a protective surface layer prepared from tetraethylene glycol dimethacrylate.

EXAMPLE 21

Polymerizable compositions each composed of 100 parts of trimethylolpropane triacrylate and predetermined parts of a photosensitizer, as shown in Table 4, were separately spread at a thickness of 0.05 mm over an outer surface of each polymethyl methacrylate dust cover prepared by a press forming procedure. The spread polymerizable compositions were hardened by a procedure similar to that employed in Examples 15 – 20. The products were tested for their mar resistance by the steel wool pad rubbing procedure at a load of 1,000 g. Results are shown in Table 4. Microphotographs (100 magnifications) of specimens Run No. 2 and No. 7, both of which have been tested for their mar resistance, are shown in FIGS. 3 and 4, respectively.

Table 4

| Run No. | Photosensitizer (parts) | Mar resistance | Note |
|---|---|---|---|
| 1 | Benzoin (2) | VG | Completely hardened |
| 2 | Benzoin methyl ether (2) | VG | " |
| 3 | Benzoin ethyl ether (2) | VG | " |
| 4 | Azobisisobutyronitrile (5) | — | Not hardened, tacky |
| 5 | Arochlor 1260 (2) | — | " |
| 6 | Aroclor 1260 (10) | — | " |
| 7 | Aroclor 1260 (30) | VP | Tack-free but wax-like and not hard |
| 8 | Aroclor 1260 (50) | VP | " |

Note: Aroclor 1260, Monsanto Chemical Co.'s biphenyl containing 60% by weight of chlorine.

EXAMPLE 22

Polymethylmethacrylate lenses for glasses having a protective surface layer were prepared employing a polymerizable composition and polymerization conditions similar to those employed in Example 15. The resultant lenses had improved mar resistance similar to that in Example 15.

EXAMPLE 23

A polymethyl methacrylate meter protector plate having a protective surface layer was prepared employing a polymerizable composition and polymerization conditions similar to those employed in Example 19. The resultant meter protector plate had improved mar resistance similar to that in Example 19.

EXAMPLE 24

Polycarbonate lenses for glasses having a protective surface layer were prepared employing a polymerizable composition and polymerization conditions similar to those employed in Example 20. The resultant lenses had improved mar resistance similar to that in Example 20.

What we claim is:

1. A synthetic resin shaped article having a mar-resistant polymer surface layer integrated with the polymer body, said polymer surface layer consisting essentially of, in polymerized form,
   a. a compound having a total of at least three acryloxy ($CH_2=CH.CO.O-$) and/or methacryloxy ($CH_2=C(CH_3).CO.O-$) groups in the molecule, said acryloxy and methacryloxy groups being linked with a straight chain aliphatic hydrocarbon residue having not more than 20 carbon atoms or a straight chain aliphatic hydrocarbon residue having at least one ether linkage in the main chain and having not more than 20 carbon atoms and
   b. at least one copolymerizable mono- or diethylenically unsaturated compound, the ratio by weight of compound (b)/compound (a) being 0/100 to 80/20 when compound (b) is a diethylenically unsaturated compound and 0/100 to 30/70 when compound (b) is a monoethylenically unsaturated compound, and said polymer surface layer having a mar-resistance to an extent such that no appreciable scratches are produced when a 25 mm diameter pad composed of No. 000 steel wool is rotated 100 revolutions at a rate of 40 R.P.M. while being pressed against the shaped article at a load of 1,000 g. and being prepared by completely polymerizing the monomer charge in an air-free atmosphere and in the presence of not greater than 5% by weight of an initiator, said initiator being at least one compound selected from the group consisting of azobisisobutyronitrile, benzoyl peroxide, lauryl peroxide, benzoin and benzoin alkyl ether having at most 4 carbon atoms in the alkyl group, and said polymer body being selected from the group consisting of polymethyl methacrylate, polycarbonate and a copolymer containing at least 70 % by weight of units derived from methyl methacrylate.

2. A synthetic resin shaped article according to claim 1 wherein said straight chain aliphatic hydrocarbon residue has not more than 10 carbon atoms.

3. A synthetic resin shaped article according to claim 1 wherein said compound having a total of at least three acryloxy and/or methacryloxy groups in the molecule is selected from esters prepared by reacting trimethylolethane, trimethylolpropane or pentaerythritol with acrylic acid or methacrylic acid.

4. A synthetic resin shaped article according to claim 1 wherein said compound having a total of at least three acryloxy and/or methacryloxy groups in the molecule is selected from the group consisting of trimethylolethane triacrylate, trimethylolpropane triacrylate and pentaerythritol tetraacrylate.

5. A synthetic resin shaped article according to claim 1 wherein said copolymerizable mono- or diethylenically unsaturated compound has one or two acryloxy or methacryloxy groups in the molecule.

6. A synthetic resin shaped article according to claim 5 wherein said compound is selected from the group consisting of ethylene glycol diacrylate, 1,3-propylene glycol diacrylate, 1,2-propylene glycol diacrylate, 1,4-butylene glycol diacrylate, 1,3-butylene glycol diacrylate, 1,6-hexanediol diacrylate, acrylic acid, methyl acrylate, ethyl acrylate, propyl acrylate and butyl acrylate.

7. A synthetic resin shaped article according to claim 1 wherein said polymer surface layer consists essentially of, in polymerized form, (a) 40 to 100% by weight of a compound selected from the group consisting of trimethylolethane triacrylate, trimethylolpropane triacrylate and pentaerythritol tetraacrylate and (b) 0 to 60% by weight of a compound selected from the group consisting of ethylene glycol diacrylate, 1,3-propylene glycol diacrylate, 1,2-propylene glycol diacrylate, 1,4-butylene glycol diacrylate, 1,3-butylene glycol diacrylate, 1,6-hexanediol diacrylate, acrylic acid, methyl acrylate, ethyl acrylate, propyl acrylate and butyl acrylate.

8. A synthetic resin shaped article according to claim 1 wherein said polymer surface layer is formed by polymerizing said compounds (a) and (b) by means of irradiation in the presence of a carbonyl compound as a photosensitizer.

9. A synthetic resin shaped article according to claim 8 wherein said carbonyl compound is selected from the group consisting of benzoin, benzoin methyl ether, benzoin propyl ether and benzoin butyl ether and employed in an amount of not more than 5 parts by weight per 100 parts by weight of the total of said compounds (a) and (b).

10. A synthetic resin shaped article according to claim 1 wherein said polymer surface layer is formed by polymerizing said compounds (a) and (b) by means of irradiation of electron rays at a total absorbed dose of 1.0 to 30 M rad using an electron beam accelerator having an accelerator voltage of 20 to 500 KV.

11. A synthetic resin shaped article according to claim 1 wherein said polymer surface layer has a thickness of 0.01 to 0.1 mm.

12. A synthetic resin shaped article according to claim 1 which is a lens having the polymer surface layer integrated with the polymer lens body, said polymer surface layer being formed by the steps of coating the polymer lens body with said compounds (a) and (b) and then exposing the coated compounds to radiation of ultraviolet rays or electron rays.

* * * * *

UNITED STATES PATENT OFFICE
CERTIFICATE OF CORRECTION

Patent No. 3,968,305      Dated July 6, 1976

Inventor(s) AKIRA OSHIMA ET AL

It is certified that error appears in the above-identified patent and that said Letters Patent are hereby corrected as shown below:

Cover page, col. 1, under "Foreign Application Priority Data" add:

--December 28, 1970    Japan.............45-119373--

Signed and Sealed this second Day of August 1977

[SEAL]

Attest:

RUTH C. MASON
*Attesting Officer*

C. MARSHALL DANN
*Commissioner of Patents and Trademarks*